US012612034B2

(12) United States Patent
Ali et al.

(10) Patent No.: US 12,612,034 B2
(45) Date of Patent: Apr. 28, 2026

(54) SYSTEM AND METHOD FOR PROVIDING INFORMATION TO FIRST RESPONDERS AFTER A VEHICLE COLLISION

(71) Applicant: GM Global Technology Operations LLC, Detroit, MI (US)

(72) Inventors: Kamran Ali, Troy, MI (US); Jinzhu Chen, Troy, MI (US); Donald K. Grimm, Utica, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 185 days.

(21) Appl. No.: 18/462,758

(22) Filed: Sep. 7, 2023

(65) Prior Publication Data

US 2025/0083665 A1     Mar. 13, 2025

(51) Int. Cl.
| | |
|---|---|
| *B60W 30/08* | (2012.01) |
| *B60R 16/023* | (2006.01) |
| *B60R 21/00* | (2006.01) |
| *H02J 50/00* | (2016.01) |

(52) U.S. Cl.
CPC ........... *B60W 30/08* (2013.01); *H02J 50/001* (2020.01); *B60W 2030/082* (2013.01)

(58) Field of Classification Search
CPC . B60W 30/08; B60W 2030/082; H02J 50/001
See application file for complete search history.

(56) References Cited

U.S. PATENT DOCUMENTS

| | | | | |
|---|---|---|---|---|
| 10,293,782 | B1 * | 5/2019 | Schaub ..................... | B60Q 9/00 |
| 10,580,286 | B1 * | 3/2020 | Kaminski ............... | H04W 4/40 |
| 2011/0193695 | A1 * | 8/2011 | Koie ...................... | G08G 1/205 |
| | | | | 340/438 |
| 2016/0144816 | A1 * | 5/2016 | Koya ................... | G08B 25/016 |
| | | | | 340/436 |
| 2016/0159172 | A1 * | 6/2016 | Deniau ............... | B60C 23/0471 |
| | | | | 340/447 |
| 2018/0029553 | A1 * | 2/2018 | Hamakami ............ | G08B 25/08 |
| 2018/0162393 | A1 * | 6/2018 | Lee ..................... | B60T 8/17558 |
| 2019/0215672 | A1 * | 7/2019 | Orris ................. | B60H 1/00742 |
| 2020/0287411 | A1 * | 9/2020 | Chakrabartty .......... | H02J 50/20 |
| 2022/0379670 | A1 * | 12/2022 | Kandler ............. | B60C 23/0461 |
| 2023/0240906 | A1 * | 8/2023 | Chang ..................... | G01S 13/88 |
| | | | | 342/195 |

* cited by examiner

*Primary Examiner* — David P. Merlino
*Assistant Examiner* — Mahmoud M Kazimi
(74) *Attorney, Agent, or Firm* — Vivacqua Crane, PLLC

(57) ABSTRACT

A system for providing information about a vehicle involved in a collision includes a sensing device affixed to the vehicle. The sensing device includes a sensor module configured to perform measurements of one or more conditions of the vehicle, an antenna module configured to transmit and receive radio-frequency (RF) signals, a power module configured to provide power to the sensing device, and a sensing device controller. The sensing device controller is in electrical communication with the sensor module, the antenna module, and the power module. The sensing device controller is programmed to receive an excitation signal from an external transceiving device. The sensing device controller is further programmed to perform a measurement using the sensor module in response to receiving the excitation signal. The sensing device controller is further programmed to transmit the measurement to the external transceiving device using the antenna module.

16 Claims, 3 Drawing Sheets

SYSTEM AND METHOD FOR PROVIDING INFORMATION TO FIRST RESPONDERS AFTER A VEHICLE COLLISION

The present disclosure relates to systems and methods for providing information to first responders after a vehicle collision.

To increase occupant safety, vehicles may be equipped with safety systems, including, for example, safety restraint systems (SRS). Safety restraint systems may include passive restraints (e.g., seat belts), active restraints (e.g., airbags), and/or a combination of passive and active restraints (e.g., seat belts with active pretensioners). Additionally, vehicles may be equipped with telecommunications systems configured to communicate with emergency services upon determination that a vehicle collision has occurred. However, current safety restraint systems and telecommunications systems may not provide first responders arriving on the scene of a vehicle collision with important information about a state of the vehicle and the occupants of the vehicle. Additionally, current safety restraint systems and telecommunications systems may not allow first responders to monitor vehicle safety and integrity metrics in real-time from the scene of the vehicle collision.

Thus, while vehicle safety systems and methods achieve their intended purpose, there is a need for a new and improved system and method for providing information about a vehicle involved in a collision.

SUMMARY

According to several aspects, a system for providing information about a vehicle involved in a collision may include a sensing device affixed to the vehicle. The sensing device includes a sensor module configured to perform measurements of one or more conditions of the vehicle, an antenna module configured to transmit and receive radio-frequency (RF) signals, a power module configured to provide power to the sensing device, and a sensing device controller. The sensing device controller is in electrical communication with the sensor module, the antenna module, and the power module. The sensing device controller is programmed to receive an excitation signal from an external transceiving device. The sensing device controller is further programmed to perform a measurement using the sensor module in response to receiving the excitation signal. The sensing device controller is further programmed to transmit the measurement to the external transceiving device using the antenna module.

In another aspect of the present disclosure, the power module of the sensing device includes an energy harvesting circuit configured to harvest energy from an environment surrounding the sensing device.

In another aspect of the present disclosure, the energy harvesting circuit is a radio-frequency (RF) energy harvesting circuit. The RF energy harvesting circuit is in electrical communication with at least one antenna of the antenna module configured to harvest RF energy from the excitation signal.

In another aspect of the present disclosure, the sensing device is affixed to a battery module of the vehicle. The sensor module includes a temperature sensor. To perform the measurement, the sensing device controller is further programmed to perform a temperature measurement of the battery module of the vehicle using the temperature sensor of the sensor module.

In another aspect of the present disclosure, the sensing device is affixed in a cabin area of the vehicle. The sensor module includes a camera and a microphone. To perform the measurement, the sensing device controller is further programmed to capture a plurality of images of the cabin area of the vehicle using the camera of the sensor module. To perform the measurement, the sensing device controller is further programmed to capture an audio recording of the cabin area of the vehicle using the microphone.

In another aspect of the present disclosure, the external transceiving device is configured to receive a plurality of measurements from one or more sensing devices and perform stitching of the plurality of measurements.

In another aspect of the present disclosure, the system further includes a vehicle communication system in wireless communication with the antenna module of the sensing device and vehicle controller in electrical communication with the vehicle communication system. The vehicle controller is programmed to transmit a vehicle state dataset to the sensing device using the vehicle communication system.

In another aspect of the present disclosure, the sensing device controller is further programmed to receive the vehicle state dataset from the vehicle communication system using the antenna module. The sensing device controller is further programmed to save the vehicle state dataset in a non-transitory memory of the sensing device controller. The sensing device controller is further programmed to transmit the vehicle state dataset to the external transceiving device in response to receiving the excitation signal.

In another aspect of the present disclosure, the vehicle state dataset includes at least one of: a current vehicle speed, a current vehicle fuel level, a current vehicle battery state of charge, and a number, identity, and location of occupants in the vehicle.

In another aspect of the present disclosure, the sensing device is affixed to an exterior of the vehicle. The sensing device is configured to be jettisoned upon determination of a vehicle collision condition.

According to several aspects, a method for providing information about a vehicle involved in a collision may include receiving an excitation signal using an antenna module of a sensing device. The sensing device is affixed to the vehicle. The method further may include harvesting energy from the excitation signal using a power module of the sensing device. The power module includes a radio-frequency (RF) energy harvesting circuit. The method further may include performing a measurement using a sensor module of the sensing device in response to receiving the excitation signal. The method further may include transmitting the measurement using the antenna module of the sensing device.

In another aspect of the present disclosure, performing the measurement further may include performing a temperature measurement of a battery module of the vehicle using a temperature sensor of the sensor module.

In another aspect of the present disclosure, performing the measurement further may include capturing a plurality of images of a cabin area of the vehicle using a camera of the sensor module. Performing the measurement further may include capturing an audio recording of the cabin area of the vehicle using a microphone of the sensor module.

In another aspect of the present disclosure, the method further may include receiving a vehicle state dataset using the antenna module of the sensing device. The method further may include saving the vehicle state dataset in a non-transitory memory of a sensing device controller of the sensing device. The method further may include transmitting the vehicle state dataset using the antenna module of the sensing device in response to receiving the excitation signal.

In another aspect of the present disclosure, receiving the vehicle state dataset further may include receiving the vehicle state dataset using the antenna module of the sensing device. The vehicle state dataset includes at least one of: a current vehicle speed, a current vehicle fuel level, a current vehicle battery state of charge, and a number, identity, and location of occupants in the vehicle.

In another aspect of the present disclosure, the method further may include receiving a plurality of measurements and a plurality of vehicle state datasets from one or more sensing devices using an external transceiving device. The method further may include stitching the plurality of measurements and the plurality of vehicle state datasets from one or more sensing devices using a transceiving device controller of the external transceiving device to generate a processed vehicle state dataset. The method further may include displaying the processed vehicle state dataset using a display of the external transceiving device.

In another aspect of the present disclosure, the method further may include identifying a vehicle collision condition. The method further may include jettisoning the sensing device from the vehicle in response to identifying the vehicle collision condition.

According to several aspects, a system for providing information about a vehicle involved in a collision may include an external transceiving device. The external transceiving device includes a transceiving device display, a transceiving device communication system, and a transceiving device controller in electrical communication with the transceiving device display and the transceiving device communication system. The transceiving device controller is programmed to transmit an excitation signal using the transceiving device communication system. The transceiving device controller is further programmed to receive one or more response messages using the transceiving device communication system. The transceiving device controller is further programmed to stitch the one or more response messages to form a processed response message. The transceiving device controller is further programmed to display the processed response message using the transceiving device display. The system further may include a sensing device affixed to the vehicle. The sensing device includes a sensor module configured to perform measurements of one or more conditions of the vehicle, an antenna module configured to transmit and receive radio-frequency (RF) signals, a power module configured to provide power to the sensing device, and a sensing device controller in electrical communication with the sensor module, the antenna module, and the power module. The sensing device controller is programmed to receive the excitation signal from the external transceiving device. The sensing device controller is further programmed to perform a measurement using the sensor module in response to receiving the excitation signal. The sensing device controller is further programmed to transmit the measurement to the external transceiving device using the antenna module.

In another aspect of the present disclosure, the sensing device controller is further programmed to receive a vehicle state dataset from the vehicle. The sensing device controller is further programmed to transmit the vehicle state dataset to the external transceiving device using the antenna module in response to receiving the excitation signal.

In another aspect of the present disclosure, the vehicle state dataset includes at least one of: a current vehicle speed, a current vehicle fuel level, a current vehicle battery state of charge, and a number, identity, and location of occupants in the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

When a vehicle collision has occurred, it is often important for first responders to determine information about the circumstances leading to the vehicle collision and the current state of the vehicle and vehicle occupants. Complex, dynamic, and time-sensitive vehicle collision scenes may present challenges to first responders who must quickly establish a plan to provide assistance to vehicle occupants while minimizing risk of further endangerment to the first responders and the vehicle occupants. Therefore, the present disclosure provides a new and improved system and method for providing information about a vehicle involved in a collision.

Figure 1:
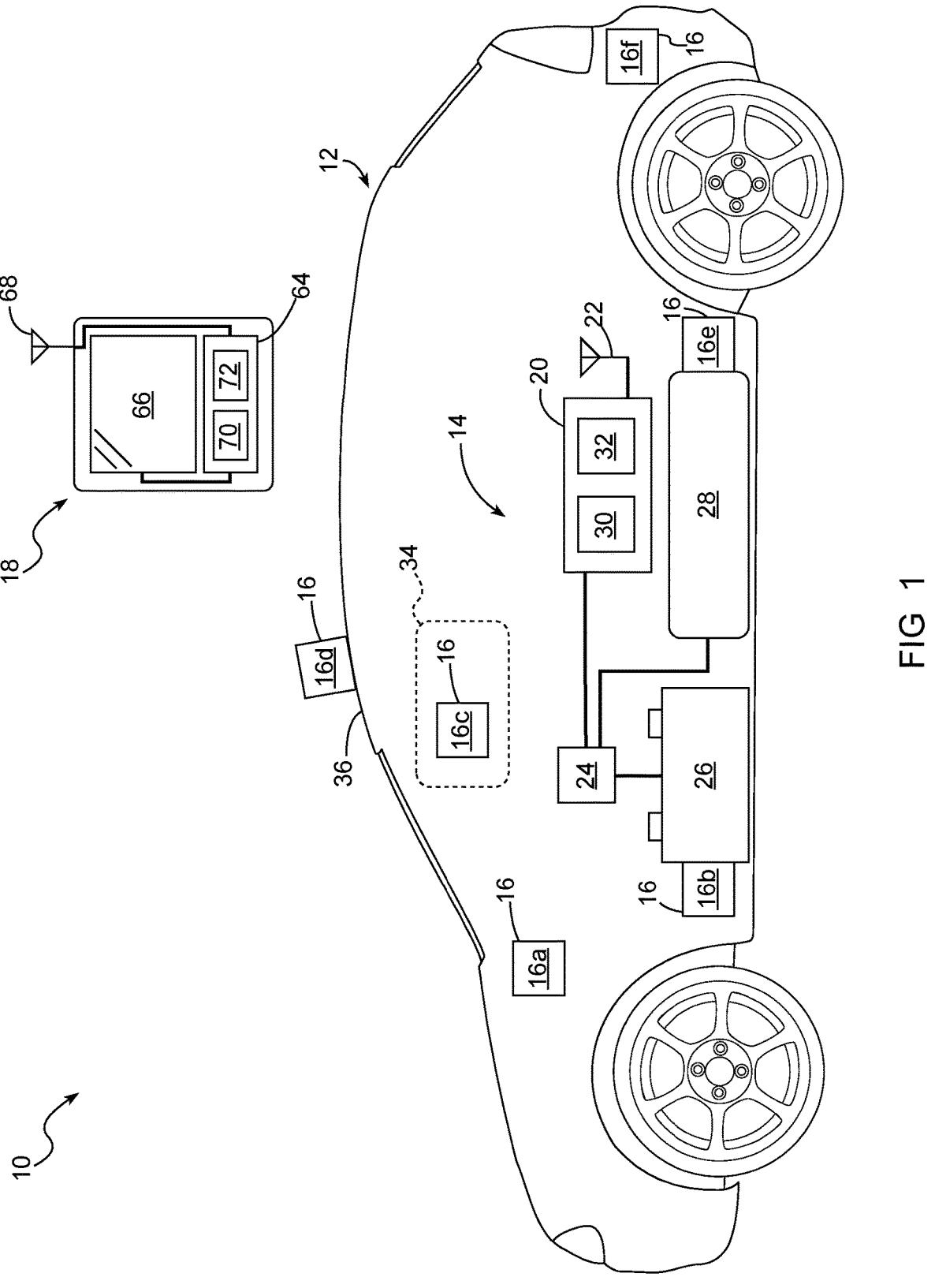
FIG. 1 is a schematic diagram of a system for providing information about a vehicle involved in a collision, according to an exemplary embodiment.

Referring to FIG. 1, a system for providing information about a vehicle involved in a collision is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a vehicle system 14, a plurality of sensing devices 16, and an external transceiving device 18.

The vehicle system 14 includes a vehicle controller 20, a vehicle communication system 22, a vehicle status monitor 24, a vehicle battery module 26, and a vehicle fuel tank 28.

The vehicle controller 20 is used to implement a method 100 for providing information about a vehicle involved in a collision, as will be described below. The vehicle controller 20 includes at least one processor 30 and a non-transitory computer readable storage device or media 32. The processor 30 may be a custom made or commercially available processor, a central processing unit (CPU), a graphics processing unit (GPU), an auxiliary processor among several processors associated with the vehicle controller 20, a semiconductor-based microprocessor (in the form of a microchip or chip set), a macroprocessor, a combination thereof, or generally a device for executing instructions. The computer readable storage device or media 32 may include volatile and nonvolatile storage in read-only memory (ROM), random-access memory (RAM), and keep-alive memory (KAM), for example. KAM is a persistent or non-volatile memory that may be used to store various operating variables while the processor 30 is powered down. The computer-readable storage device or media 32 may be implemented using a number of memory devices such as PROMs (programmable read-only memory), EPROMS (electrically PROM), EEPROMs (electrically erasable PROM), flash memory, or another electric, magnetic, optical, or combination memory devices capable of storing data, some of which represent executable instructions, used by the vehicle controller 20 to control various systems of the vehicle 12. The vehicle controller 20 may also consist of multiple vehicle controllers which are in electrical communication with each other. The vehicle controller 20 may be inter-connected with additional systems and/or controllers of the vehicle 12, allowing the vehicle controller 20 to access data such as, for example, speed, acceleration, braking, and steering angle of the vehicle 12.

The vehicle controller 20 is in electrical communication with the vehicle communication system 22 and the vehicle status monitor 24. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the vehicle controller 20 are within the scope of the present disclosure.

The vehicle communication system 22 is used by the vehicle controller 20 to communicate with other systems external to the vehicle 12. For example, the vehicle communication system 22 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 22 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the vehicle communication system 22 may further include an embedded universal integrated circuit card (eUICC) configured to store at least one cellular connectivity configuration profile, for example, an embedded subscriber identity module (eSIM) profile. The vehicle communication system 22 is further configured to communicate via a personal area network (e.g., BLUETOOTH) and/or near-field communication (NFC). However, additional or alternate communication methods, such as a dedicated short-range communications (DSRC) channel and/or mobile telecommunications protocols based on the 3rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 20, 15, 16 and/or future 3GPP releases are considered within the scope of the present disclosure. Accordingly, the vehicle communication system 22 may include one or more antennas and/or communication transceivers for receiving and/or transmitting signals, such as cooperative sensing messages (CSMs). The vehicle communication system 22 is configured to wirelessly communicate information between the vehicle 12 and another vehicle. Further, the vehicle communication system 22 is configured to wirelessly communicate information between the vehicle 12 and infrastructure or other vehicles. It should be understood that the vehicle communication system 22 may be integrated with the vehicle controller 20 (e.g., on a same circuit board with the vehicle controller 20 or otherwise a part of the vehicle controller 20) without departing from the scope of the present disclosure.

The vehicle status monitor 24 is used to monitor status metrics of various vehicle systems and provide status information to the vehicle controller 20. In an exemplary embodiment, the vehicle status monitor is a device having a controller similar in structure and function to the vehicle controller 20. The vehicle status monitor 24 includes one or more electrical input and/or output ports and is capable of communicating with vehicle systems using communication protocols, such as, for example, a CAN network, a FLEXRAY network, a local area network (e.g., WiFi, ethernet, and the like), a serial peripheral interface (SPI) network, and/or the like.

The vehicle status monitor 24 is configured to electrically communicate with a battery management system (BMS) of the vehicle battery module 26 to determine status metrics of the vehicle battery module 26, such as, for example, a state-of-charge (SOC), a state-of-health (SOH), a battery module temperature, and/or the like. The vehicle status monitor 24 is further configured to electrically communicate with a fuel level sensor of the vehicle fuel tank 28 to determine status metrics of the vehicle fuel tank 28, such as, for example, a volume of fuel within the vehicle fuel tank 28 (e.g., twenty liters). In a non-limiting example, the vehicle status monitor 24 is configured to periodically poll the vehicle battery module 26 and the vehicle fuel tank 28 to determine the status metrics. In another non-limiting example, the vehicle status monitor 24 is configured to receive (e.g., using software interrupts) the status metrics. After receiving the status metrics, the vehicle status monitor 24 transmits the status metrics to the vehicle controller 20.

In an exemplary embodiment, the vehicle status monitor 24 is in electrical communication with a plurality of additional sensors of the vehicle 12, including, for example, a motor speed sensor, a motor torque sensor, an electric drive motor voltage and/or current sensor, an accelerator pedal position sensor, a brake position sensor, a coolant temperature sensor, a cooling fan speed sensor, a transmission oil temperature sensor, a seat occupancy sensor, an airbag deployment sensor, a seatbelt pretensioner sensor, an accelerometer, an inertial measurement unit (IMU), a vibration sensor, a cabin air temperature sensor, a cabin motion detection sensor, a cabin camera, a cabin microphone, an ambient air temperature sensor, a barometric pressure sensor, and/or a global navigation satellite system (GNSS).

It should be understood that the vehicle status monitor 24 may be configured to monitor any system and/or sensor of the vehicle 12 and provide status information to the vehicle controller 20 without departing from the scope of the present disclosure. The vehicle status monitor 24 is in electrical communication with the vehicle battery module 26, the vehicle fuel tank 28, and the vehicle controller 20, as discussed above.

The vehicle battery module 26 stores and provides electrical energy in the form of direct current (DC) for propulsion of the vehicle 12. In an exemplary embodiment, the vehicle battery module 26 includes a plurality of battery cells (e.g., lithium-ion battery cells) electrically connected in series and/or parallel to provide an increased voltage and/or current-carrying capacity. In a non-limiting example, the plurality of battery cells are housed in an enclosure configured to protect the plurality of battery cells from mechanical vibration, water intrusion, and dust intrusion. The enclosure is also configured to provide temperature regulation (e.g., using a liquid cooling system, a resistive heating system, and/or the like). In an exemplary embodiment, the vehicle battery module 26 further includes a battery management system (BMS) configured to monitor battery characteristics such as a state of charge (SOC), state of health (SOH), temperature, and/or the like, and transmit the battery characteristics to the vehicle status monitor 24. In a non-limiting example, the BMS includes a BMS controller in electrical communication with a plurality of BMS sensors disposed within the enclosure of the vehicle battery module 26. In an exemplary embodiment, the vehicle battery module 26 provides a DC voltage across a positive and negative output terminal.

The vehicle fuel tank 28 is used to store fuel used to provide energy to propel the vehicle 12. In an exemplary embodiment, the vehicle fuel tank 28 is a plastic (e.g., high-density polyethylene) or metal (e.g., steel) tank configured to safely store liquid fuel (e.g., gasoline, kerosene, diesel, and/or the like). In another exemplary embodiment, the vehicle fuel tank 28 is a pressure vessel configured to safely store pressurized liquid or gaseous fuel (e.g., hydrogen, propane, and/or the like). In an exemplary embodiment, the vehicle fuel tank 28 includes a fuel level sensor and a fuel pump. In a non-limiting example, the fuel level sensor is an electrical or electromechanical device configured to measure a volume of fuel contained within the vehicle fuel tank 28. The fuel pump is an electrical or electromechanical device configured to pump fuel from the vehicle fuel tank 28 to an engine of the vehicle 12, such as, for example, an internal combustion engine of the vehicle 12. The fuel level sensor is in electrical communication with the vehicle status monitor 24, as discussed above.

With continued reference to FIG. 1, the plurality of sensing devices 16 are used to gather information about the vehicle 12 and transmit the information to the external transceiving device 18. In an exemplary embodiment, the plurality of sensing devices 16 are distributed throughout the vehicle. In a non-limiting example, a first sensing device 16a is affixed in a front structural region of the vehicle 12 (e.g., near an A-pillar of the vehicle 12). A second sensing device 16b is affixed to the vehicle battery module 26. A third sensing device 16c is affixed in a cabin area 34 of the vehicle 12. In the scope of the present disclosure, the cabin area 34 is an occupant compartment of the vehicle 12 configured to transport occupants of the vehicle 12. A fourth sensing device 16d is affixed to an exterior surface 36 of the vehicle 12. A fifth sensing device 16e is affixed to the vehicle fuel tank 28. A sixth sensing device 16f is affixed in a rear structural region of the vehicle 12 (e.g., near a rear towing hitch of the vehicle 12).

Figure 2:
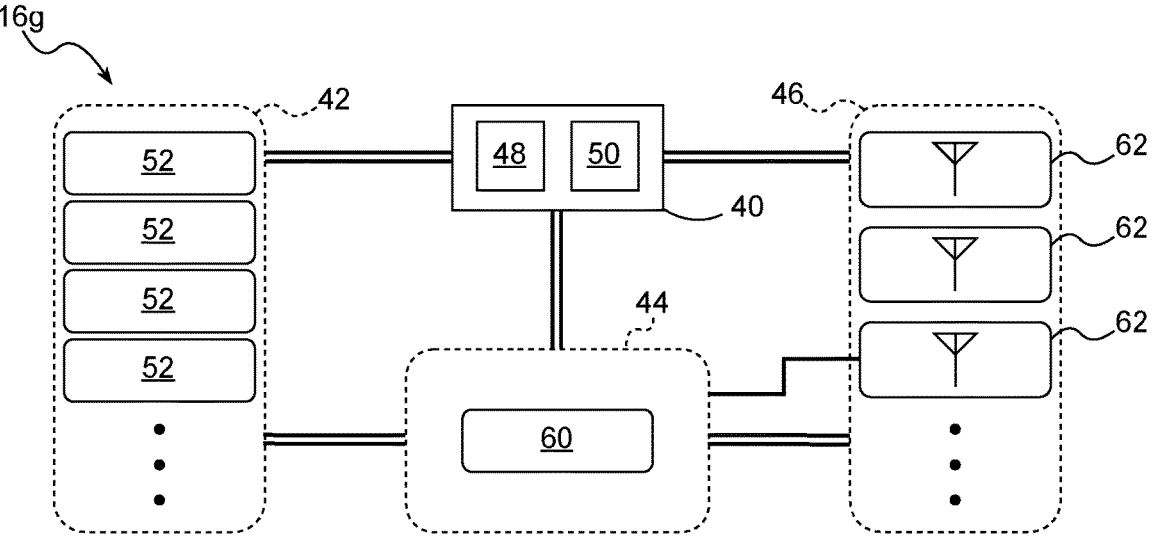
FIG. 2 is a block diagram of an exemplary sensing device, according to an exemplary embodiment.

Referring to FIG. 2, a block diagram of an exemplary sensing device 16g of the plurality of sensing devices 16 is shown. The exemplary sensing device 16g includes a sensing device controller 40, a sensor module 42, a power module 44, and an antenna module 46.

The sensing device controller 40 is used to control the sensor module 42 and the antenna module 46, as will be described below. The sensing device controller 40 includes at least one sensing device processor 48 and a sensing device non-transitory computer readable storage device or sensing device media 50. The sensing device processor 48 may be a custom made or commercially available processor, a central processing unit (CPU), a graphics processing unit (GPU), an auxiliary processor among several processors associated with the sensing device controller 40, a semiconductor-based microprocessor (in the form of a microchip or chip set), a macroprocessor, a combination thereof, or generally a device for executing instructions. The sensing device computer readable storage device or sensing device media 50 may include volatile and nonvolatile storage in read-only memory (ROM), random-access memory (RAM), and keep-alive memory (KAM), for example. KAM is a persistent or non-volatile memory that may be used to store various operating variables while the sensing device processor 48 is powered down. The sensing device computer-readable storage device or sensing device media 50 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the sensing device controller 40 to control the sensor module 42 and the antenna module 46. The sensing device controller 40 may also consist of multiple controllers which are in electrical communication with each other.

The sensor module 42 is used to perform measurements of one or more conditions of the vehicle 12. In an exemplary embodiment, the sensor module 42 includes a plurality of sensors 52. In a non-limiting example, the plurality of sensors 52 includes at least one of: a temperature sensor, a humidity sensor, a camera, a microphone, a vibration sensor, an accelerometer, an inertial measurement unit (IMU), a light sensor, a proximity sensor, a gas sensor, a magnetic sensor, a heart rate sensor, an ultrasonic sensor, and/or the like. The sensor module 42 is in electrical communication with the sensing device controller 40 and the power module 44.

Figures 3A, 3B, 3C:
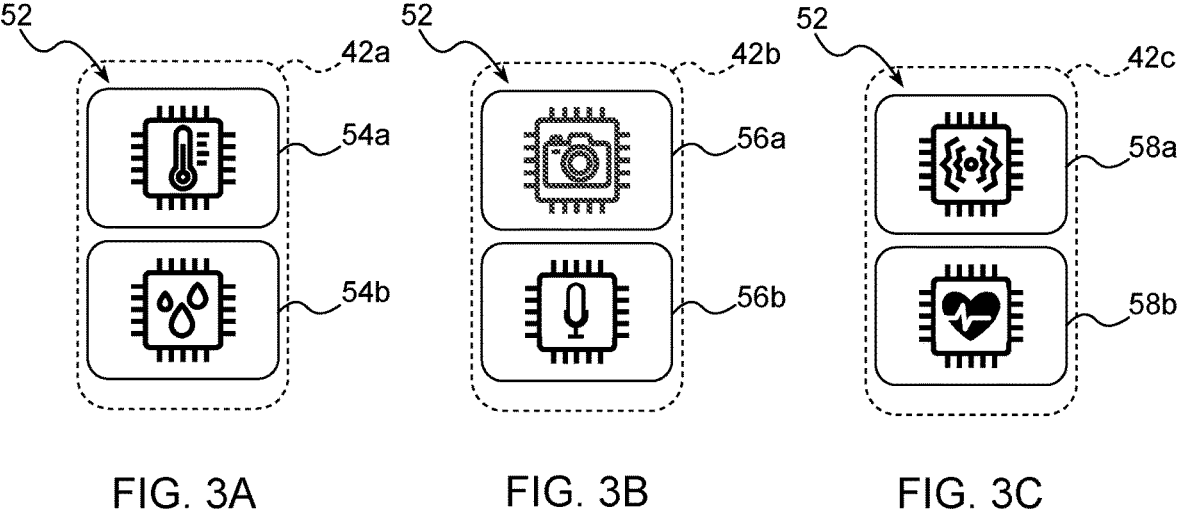
FIG. 3A is a first exemplary sensor module of the exemplary sensing device, according to an exemplary embodiment.
FIG. 3B is a second exemplary sensor module of the exemplary sensing device, according to an exemplary embodiment.
FIG. 3C is a third exemplary sensor module of the exemplary sensing device, according to an exemplary embodiment.

Referring to FIG. 3A, a first exemplary sensor module 42a is shown. The first exemplary sensor module 42a includes a temperature sensor 54a and a humidity sensor 54b. In an exemplary embodiment, the second sensing device 16b affixed to the vehicle battery module 26 includes the first exemplary sensor module 42a, such that the second sensing device 16b may be used to perform a temperature measurement and a humidity measurement to determine a temperature and a humidity of the vehicle battery module 26.

Referring to FIG. 3B, a second exemplary sensor module 42b is shown. The second exemplary sensor module 42b includes a camera 56a and a microphone 56b. In an exemplary embodiment, the third sensing device 16c affixed in the cabin area 34 includes the second exemplary sensor module 42b, such that the third sensing device 16c may be used to capture a plurality of images and capture an audio recording to determine information about occupants in the cabin area 34 (e.g., a number, identity, and location of occupants in the vehicle 12).

Referring to FIG. 3C, a third exemplary sensor module 42c is shown. The third exemplary sensor module 42c includes a seat occupancy sensor 58a and a heart rate sensor 58b. In an exemplary embodiment, the third sensing device 16c affixed in the cabin area 34 includes the third exemplary sensor module 42c, such that the third sensing device 16c may be used to determine information about occupants in the cabin area 34 (e.g., a number, identity, location, and health status of occupants in the vehicle 12).

In an exemplary embodiment, the sensor module 42 of the first sensing device 16a affixed in the front structural region of the vehicle 12 includes, for example, a vibration sensor, a strain sensor, and an IMU, such that the first sensing device 16a may be used to determine a structural integrity of the front structural region of the vehicle. In an exemplary embodiment, the sensor module 42 of the fourth sensing device 16d affixed to an exterior surface 36 of the vehicle 12 includes, for example, an IMU, such that the fourth sensing device 16d may be used to determine an orientation of the vehicle 12. In an exemplary embodiment, the sensor module 42 of the fifth sensing device 16e affixed to the vehicle fuel tank 28 includes, for example, a chemical sensor, such that the fifth sensing device 16e may be used to detect a fuel leak from the vehicle fuel tank 28. In an exemplary embodiment, the sensor module 42 of the sixth sensing device 16f affixed in the rear structural region of the vehicle 12 includes, for example, a vibration sensor, a strain sensor, and an IMU, such that the first sensing device 16a may be used to determine a structural integrity of the rear structural region of the vehicle 12 and/or a towing status of the vehicle 12.

Referring again to FIG. 2, the power module 44 is used to provide power to the sensing device controller 40, the sensor module 42, and the antenna module 46. In an exemplary embodiment, the power module 44 includes a radio-frequency (RF) energy harvesting circuit 60.

In a non-limiting example, the RF energy harvesting circuit 60 includes a rectifier component, a voltage regulation component, and an energy storage component. The rectifier component is configured to convert alternating current signals received by the antenna module 46 to direct current. The rectifier component is in electrical communication with the antenna module 46 and the voltage regulation component. The voltage regulation component is configured to smooth and regulate the direct current produced by the rectifier component. In a non-limiting example, the voltage regulation component includes a linear voltage regulator, a switching voltage regulator, and/or the like. The voltage regulation component is in electrical communication with the rectifier component and the energy storage component. The energy storage component is configured to store energy captured by the RF energy harvesting circuit 60. In a non-limiting example, the energy storage component includes a capacitor, a battery, and/or the like. It should be understood that the above description of the RF energy harvesting circuit 60 is merely exemplary in nature, and that additional circuits configured to harvest RF energy are within the scope of the present disclosure.

In another exemplary embodiment, the power module 44 includes another type of energy harvesting circuit, such as, for example, an energy harvesting circuit configured to harvest energy from movement (e.g., vibration), solar radiation, temperature gradients, and/or the like.

In another exemplary embodiment, the power module 44 includes a battery. In a non-limiting example, the battery is non-rechargeable. In another non-limiting example, the battery is rechargeable (e.g., a lithium iron phosphate battery), and is in electrical communication with a vehicle electrical system to be continuously recharged.

The antenna module 46 is used to communicate with the external transceiving device 18 and the vehicle communication system 22. The antenna module 46 is further configured to receive RF energy. The antenna module 46 includes one or more antennas 62. In an exemplary embodiment, the one or more antennas 62 include one or more communications antennas and one or more energy harvesting antennas. The one or more communications antennas are configured to communicate with the external transceiving device 18 and the vehicle communication system 22. The one or more energy harvesting antennas are used to harvest RF energy and transmit the harvested RF energy to the RF energy harvesting circuit 60. The RF energy harvesting circuit 60 is in electrical communication with the one or more energy harvesting antennas.

In another exemplary embodiment, the one or more antennas 62 includes a single antenna configured for both communication and energy harvesting. In a non-limiting example, the one or more antennas 62 are used to perform backscatter communication. In the scope of the present disclosure, backscatter communication means that the one or more antennas 62 are used to modify and reflect incoming RF signals in order to communicate information. It should be understood that the one or more antennas 62 may include various types of antennas, for example, dipole antennas, (e.g., dipole turnstile antennas, dipole corner reflector antennas, and dipole microstrip antennas), monopole antennas (e.g., monopole whip antennas), array antennas, loop antennas, and/or aperture antennas without departing from the scope of the present disclosure. It should further be understood that the one or more antennas 62 may include any types of antennas configured to receive RF energy and or communicate using RF signals.

Referring again to FIG. 1, the external transceiving device 18 is used to transmit an excitation signal to the plurality of sensing devices 16 and receive one or more response messages from the plurality of sensing devices 16. In an exemplary embodiment, the external transceiving device 18 includes a transceiving device controller 64, a transceiving device display 66, and a transceiving device communication system 68.

The transceiving device controller 64 is used to control the external transceiving device 18. The transceiving device controller 64 includes at least one transceiving device processor 70 and a transceiving device non-transitory computer readable storage device or transceiving device media 72. The transceiving device processor 70 may be a custom made or commercially available processor, a central processing unit (CPU), a graphics processing unit (GPU), an auxiliary processor among several processors associated with the transceiving device controller 64, a semiconductor-based microprocessor (in the form of a microchip or chip set), a macroprocessor, a combination thereof, or generally a device for executing instructions. The transceiving device computer readable storage device or transceiving device media 72 may include volatile and nonvolatile storage in read-only memory (ROM), random-access memory (RAM), and keep-alive memory (KAM), for example. KAM is a persistent or non-volatile memory that may be used to store various operating variables while the transceiving device processor 70 is powered down. The transceiving device computer-readable storage device or transceiving device media 72 may be implemented using a number of memory devices such as PROMs (programmable read-only memory), EPROMS (electrically PROM), EEPROMs (electrically erasable PROM), flash memory, or another electric, magnetic, optical, or combination memory devices capable of storing data, some of which represent executable instructions, used by the transceiving device controller 64 to control the external transceiving device 18. The transceiving device controller 64 may also consist of multiple controllers which are in electrical communication with each other.

The transceiving device display 66 is used to display the one or more response messages from the plurality of sensing devices 16. The transceiving device display 66 is capable of displaying text, graphics, and/or images. It should be understood that the transceiving device display 66 may include an LCD display, LED display, and/or the like without departing from the scope of the present disclosure.

The transceiving device communication system 68 The transceiving device communication system 68 is used by the transceiving device controller 64 to communicate with other systems. In certain embodiments, the transceiving device communication system 68 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). The transceiving device communication system 68 is further configured to communicate via a personal area network (e.g., BLUETOOTH) and/or near-field communication (NFC). The transceiving device communication system 68 is configured to transmit an excitation signal to the plurality of sensing devices 16 and receive one or more response messages from the plurality of sensing devices 16, as will be discussed in greater detail below.

Figure 4:
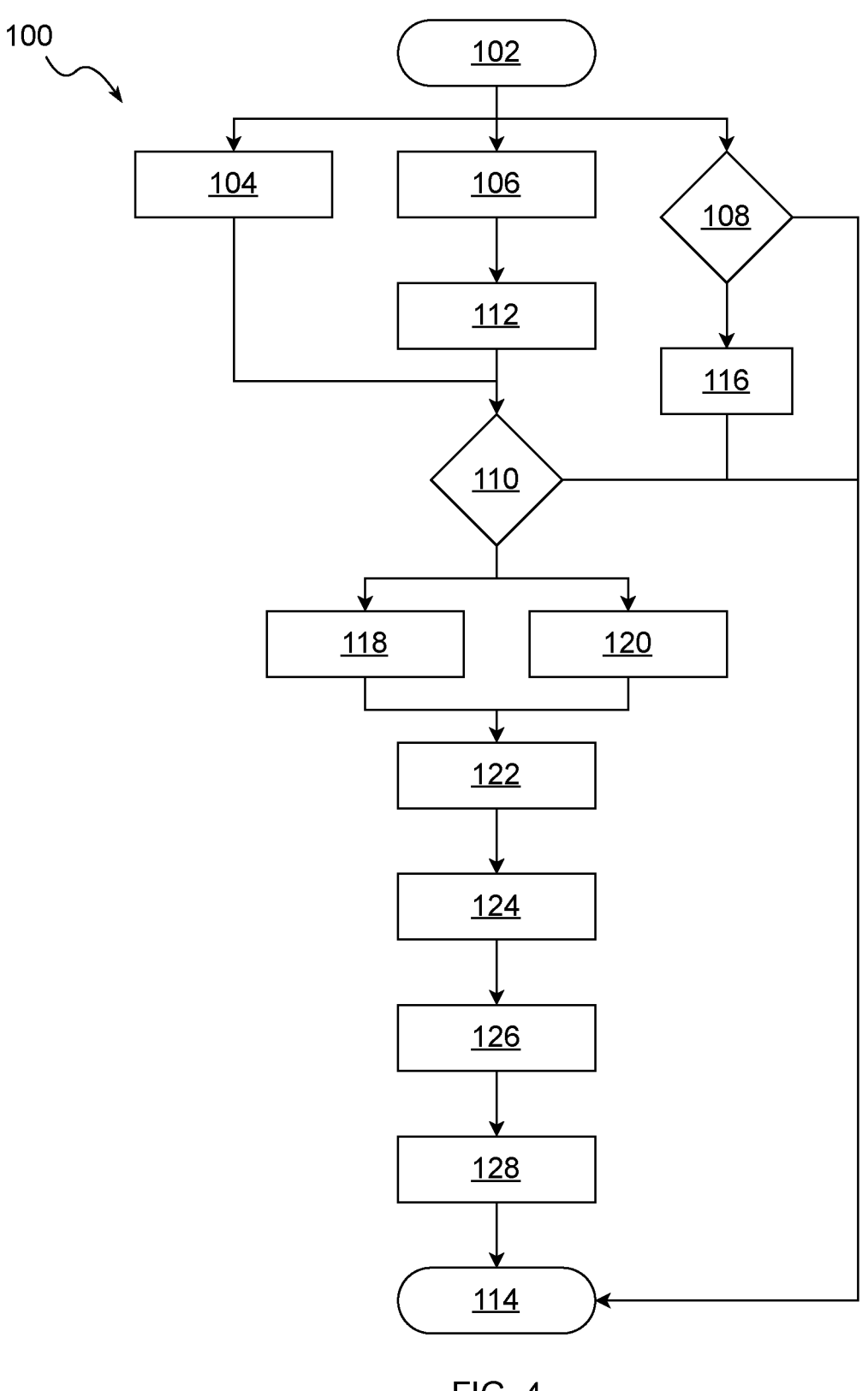
FIG. 4 is a flowchart of a method for providing information about a vehicle involved in a collision, according to an exemplary embodiment.

Referring to FIG. 4, a flowchart of the method 100 for providing information about a vehicle involved in a collision is shown. The method 100 begins at block 102 and proceeds to blocks 104, 106, and 108. At block 104, the transceiving device controller 64 of the external transceiving device 18 uses the transceiving device communication system 68 to transmit an excitation signal. In the scope of the present disclosure, the excitation signal is an RF signal transmitted by the external transceiving device 18 configured to stimulate the plurality of sensing devices 16 to respond with one or more response messages. In a non-limiting example, the excitation signal also functions to provide energy to the plurality of sensing devices 16 using the RF energy harvesting circuit 60, as discussed above. After block 104, the method 100 proceeds to block 110, as will be discussed in greater detail below.

At block 106, the vehicle controller 20 uses the vehicle communication system 22 to transmit a vehicle state dataset to one or more of the plurality of sensing devices 16. In the scope of the present disclosure, the vehicle state dataset includes at least one of: a current vehicle speed, a current vehicle fuel level, a current vehicle battery state of charge (SOC), and a number, identity, and location of occupants in the cabin area 34 of the vehicle 12. In an exemplary embodiment, the vehicle controller 20 uses the vehicle status monitor 24 to determine the vehicle state dataset, as discussed in greater detail above. It should be understood that the vehicle state dataset may include any status metric monitored by the vehicle status monitor 24 without departing from the scope of the present disclosure. After block 106, the method 100 proceeds to block 112.

At block 112, the sensing device controller 40 of one or more of the plurality of sensing devices 16 uses the antenna module 46 to receive the vehicle state dataset transmitted at block 106. In an exemplary embodiment, the power module 44 is used to harvest RF energy from the vehicle state dataset transmission. Subsequently, the sensing device controller 40 saves the vehicle state dataset in the sensing device media 50 with a timestamp indicating when the vehicle state dataset was received. In an exemplary embodiment, the sensing device controller 40 is configured to save newly received vehicle state datasets until the sensing device media 50 is full. When the sensing device media 50 is full, the sensing device controller 40 deletes the oldest vehicle state dataset. After block 112, the method 100 proceeds to block 110, as will be discussed in greater detail below.

At block 108, the vehicle controller 20 determines whether a vehicle collision condition has occurred. In the scope of the present disclosure, the vehicle collision condition means that the vehicle 12 has been involved in a collision. In a non-limiting example, the vehicle collision condition is identified using the vehicle status monitor 24. In an exemplary embodiment, the vehicle collision condition is determined to be identified if the airbag deployment sensor indicates a deployment of one or more airbags of the vehicle 12. In another exemplary embodiment, the vehicle collision condition is determined to be identified if the seatbelt pretensioner sensor indicates activation of one or more seatbelt pretensioners of the vehicle 12. In another exemplary embodiment, the vehicle collision condition is determined to be identified if the accelerometer indicates an acceleration greater than a predetermined acceleration threshold (e.g., five times the acceleration of gravity on Earth). If the vehicle collision condition is not identified, the method 100 proceeds to enter a standby state at block 114. If the vehicle collision condition is identified, the method 100 proceeds to block 116.

At block 116, one or more of the plurality of sensing devices 16 is jettisoned from the vehicle 12. In the scope of the present disclosure, jettisoned from the vehicle 12 means that the one or more of the plurality of sensing devices 16 is released from the vehicle 12, such that the one or more of the plurality of sensing devices 16 is no longer affixed to the vehicle 12. In an exemplary embodiment, the fourth sensing device 16*d* is jettisoned from the vehicle 12. In a non-limiting example, the fourth sensing device 16*d* is jettisoned from the vehicle 12 using an electromechanical mounting device configured to release the fourth sensing device 16*d* upon determination of the vehicle collision condition. In another non-limiting example, the fourth sensing device 16*d* is jettisoned from the vehicle 12 using a spring-loaded electromechanical mounting device configured to propel the fourth sensing device 16*d* away from the vehicle 12 upon determination of the vehicle collision condition. In another non-limiting example, the fourth sensing device 16*d* is jettisoned from the vehicle 12 using a pyrotechnic device configured to propel the fourth sensing device 16*d* away from the vehicle 12 upon determination of the vehicle collision condition. It should be understood that any device, mechanism, or method for separating one or more of the plurality of sensing devices 16 from the vehicle 12 is within the scope of the present disclosure. After block 116, the method 100 proceeds to enter the standby state at block 114.

At block 110, each of the plurality of sensing devices 16 determines whether the excitation signal has been received using the antenna module 46. If the excitation signal has not been received, the method 100 proceeds to enter the standby state at block 114. If the excitation signal has been received, the method 100 proceeds to blocks 118 and 120.

At block 118, one or more of the plurality of sensing devices 16 uses the antenna module 46 and the RF energy harvesting circuit 60 to harvest energy from the excitation signal received at block 110. After block 118, the method 100 proceeds to block 122, as will be discussed in greater detail below.

At block 120, one or more of the plurality of sensing devices 16 performs a measurement using the sensor module 42. In an exemplary embodiment, the first sensing device 16a affixed in the front structural region of the vehicle 12 performs the measurement using, for example, the vibration sensor, the strain sensor, and the IMU, such that the measurement may be used to determine a structural integrity of the front structural region of the vehicle. In an exemplary embodiment, the second sensing device 16b affixed to the vehicle battery module 26 performs the measurement using the first exemplary sensor module 42a, such that the measurement may be used to determine a temperature and a humidity of the vehicle battery module 26. In an exemplary embodiment, the third sensing device 16c affixed in the cabin area 34 performs the measurement using the second exemplary sensor module 42b, such that the measurement may be used to determine information about occupants in the cabin area 34 (e.g., a number, identity, and location of occupants in the vehicle 12).

In an exemplary embodiment, the fourth sensing device 16d affixed to the exterior surface 36 of the vehicle 12 performs the measurement using, for example, the IMU, such measurement may be used to determine an orientation of the vehicle 12. In an exemplary embodiment, the fifth sensing device 16e affixed to the vehicle fuel tank 28 performs the measurement using, for example, the chemical sensor, such that the measurement may be used to detect a fuel leak from the vehicle fuel tank 28. In an exemplary embodiment, the sixth sensing device 16f affixed in the rear structural region of the vehicle 12 performs the measurement using, for example, the vibration sensor, the strain sensor, and the IMU, such that the measurement may be used to determine a structural integrity of the rear structural region of the vehicle 12. After block 120, the method 100 proceeds to block 122.

At block 122, the sensing device controller 40 of the one or more of the plurality of sensing devices 16 uses the antenna module 46 to transmit the vehicle state dataset received at block 112 and the measurement performed at block 120 to the external transceiving device 18. In a non-limiting example, the vehicle state dataset received at block 112 and the measurement performed at block 120 are transmitted to the external transceiving device 18 in the form of one or more response messages. In the scope of the present disclosure, a response message is a digital communication including information such as, for example, a type and location of the one or the plurality of sensing devices 16, a timestamp, the vehicle state dataset received at block 112, and the measurement performed at block 120. After block 122, the method 100 proceeds to block 124.

At block 124, the transceiving device controller 64 uses the transceiving device communication system 68 to receive the one or more response messages transmitted by one or more of the plurality of sensing devices 16 at block 122. After block 124, the method 100 proceeds to block 126.

In an exemplary embodiment, the one or more response messages include sparse data from the plurality of sensing devices 16. In a non-limiting example, the data is sparse because of inconsistencies in energy harvesting effectiveness. Therefore, at block 126, the transceiving device controller 64 stitches the one or more response messages received at block 124 to form a processed response message. In the scope of the present disclosure, the processed response message is a stitching or concatenation of the one or more response messages. In a non-limiting example, the processed response message includes information from the one or more response messages, such as, for example, a type and location of one or the plurality of sensing devices 16, a plurality of timestamps, a processed vehicle state dataset (i.e., a stitching or concatenation of one or more vehicle datasets), and a processed measurement (i.e., a stitching or concatenation of one or more measurements).

In an exemplary embodiment, the transceiving device controller 64 first performs feature extraction on the one or more response messages. In a non-limiting example, feature extraction is performed using a computer vision algorithm, such as, for example, a scale-invariant feature transform (SIFT) algorithm. Subsequently, the transceiving device controller 64 temporally aligns frames or sections of the one or more response messages. The transceiving device controller 64 then performs feature matching (i.e., feature cross-correlation) based on the extracted features. The feature matching information is combined with information about known locations of the plurality of sensing devices 16. Finally, the one or more response messages are registered using a computer vision algorithm such as, for example, a random sample consensus (RANSAC) algorithm. It should be understood that the sparse data stitching method presented above is merely exemplary in nature, and that any method of processing and stitching sparse data may be used without departing from the scope of the present disclosure. After block 126, the method 100 proceeds to block 128.

At block 128, the transceiving device controller 64 uses the transceiving device display 66 to display the processed response message. In an exemplary embodiment, the transceiving device display 66 displays pre-collision information and post-collision information. In a non-limiting example, the pre-collision information includes information such as, for example, a speed of the vehicle 12 before the collision, a fuel level of the vehicle fuel tank 28 before the collision, a state of charge (SOC) of the vehicle battery module 26 before the collision, and a number, identity, and location of occupants in the cabin area 34 of the vehicle 12 before the collision. In a non-limiting example, the post-collision information includes information such as, for example, structural condition of the vehicle 12, an orientation of the vehicle 12, a temperature of the vehicle battery module 26, an indication of whether a fuel leak has occurred, and a health status of occupants in the cabin area 34 of the vehicle 12.

In an exemplary embodiment, the pre-collision information and the post-collision information is displayed on the transceiving device display 66 in the form of a graphical user interface (GUI), such that a first-responder to a vehicle collision may use the external transceiving device 18 to receive information about the vehicle 12 after involvement in the collision. After block 128, the method 100 proceeds to enter the standby state at block 114.

In an exemplary embodiment, the method 100 repeatedly exits the standby state 114 and restarts at block 102. In a non-limiting example, the method 100 exits the standby state 114 and restarts on a timer, for example, every three hundred milliseconds.

The system 10 and method 100 of the present disclosure offer several advantages. For example, by providing the plurality of sensing devices 16 which are energized using energy harvesting, the plurality of sensing devices 16 are not dependent on an electrical system of the vehicle 12, which may be inoperable after a collision. By providing the plurality of sensing devices 16 throughout the vehicle 12 and with a variety of sensors, the plurality of sensing devices 16 may be used to provide first responders with important information about a state of the vehicle 12, such as, for example, a likelihood of thermal runaway of the vehicle battery module 26, whether or not a fuel leak is present, and/or a number, identity, location, and health status of occupants in the vehicle 12. By jettisoning one or more of the plurality of sensing devices 16 from the vehicle 12, damage to one or more of the plurality of sensing devices 16 caused by the vehicle collision may be minimized.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for providing information about a vehicle involved in a collision, the system comprising:
   a sensing device affixed to an exterior of the vehicle, wherein the sensing device includes a sensor module configured to perform measurements of one or more conditions of the vehicle, an antenna module configured to transmit and receive radio-frequency (RF) signals, a power module configured to provide power to the sensing device, wherein the power module includes a radio-frequency (RF) energy harvesting circuit in electrical communication with at least one antenna of the antenna module configured to harvest RF energy from an excitation signal, and wherein the sensing device further includes a sensing device controller in electrical communication with the sensor module, the antenna module, and the power module, and wherein the sensing device controller is programmed to:
     receive the excitation signal from an external transceiving device, wherein the external transceiving device is external to the vehicle;
     perform a vehicle or occupant diagnostic measurement using the sensor module in response to receiving the excitation signal;
     transmit the measurement to the external transceiving device using the antenna module; and
     jettison the sensing device from the vehicle upon determination of a vehicle collision condition, wherein to jettison the sensing device, the sensing device controller is programmed to activate an electromechanical mounting device configured to release the sensing device from the vehicle.

2. The system of claim 1, wherein the sensing device is affixed to a battery module of the vehicle, wherein the sensor module includes a temperature sensor, and wherein to perform the vehicle or occupant diagnostic measurement, the sensing device controller is further programmed to:
   perform a temperature measurement of the battery module of the vehicle using the temperature sensor of the sensor module.

3. The system of claim 1, wherein the sensing device is affixed in a cabin area of the vehicle, wherein the sensor module includes a camera and a microphone, and wherein to perform the vehicle or occupant diagnostic measurement, the sensing device controller is further programmed to:
   capture a plurality of images of the cabin area of the vehicle using the camera of the sensor module; and

capture an audio recording of the cabin area of the vehicle using the microphone.

4. The system of claim 1, wherein the external transceiving device is configured to receive a plurality of measurements from one or more sensing devices and perform stitching of the plurality of measurements.

5. The system of claim 1, further comprising a vehicle communication system in wireless communication with the antenna module of the sensing device and a vehicle controller in electrical communication with the vehicle communication system, wherein the vehicle controller is programmed to:
   transmit a vehicle state dataset to the sensing device using the vehicle communication system.

6. The system of claim 5, wherein the sensing device controller is further programmed to:
   receive the vehicle state dataset from the vehicle communication system using the antenna module;
   save the vehicle state dataset in a non-transitory memory of the sensing device controller; and
   transmit the vehicle state dataset to the external transceiving device in response to receiving the excitation signal.

7. The system of claim 6, wherein the vehicle state dataset includes at least one of: a current vehicle speed, a current vehicle fuel level, a current vehicle battery state of charge, and a number, identity, and location of occupants in the vehicle.

8. A method for providing information about a vehicle involved in a collision, the method comprising:
   receiving an excitation signal using an antenna module of a sensing device, wherein the sensing device is affixed to the vehicle;
   harvesting energy from the excitation signal using a power module of the sensing device, wherein the power module includes a radio-frequency (RF) energy harvesting circuit;
   performing a measurement using a sensor module of the sensing device in response to receiving the excitation signal;
   transmitting the measurement using the antenna module of the sensing device; and
   jettisoning the sensing device from the vehicle in response to identifying a vehicle collision condition.

9. The method of claim 8, wherein performing the measurement further comprises:
   performing a temperature measurement of a battery module of the vehicle using a temperature sensor of the sensor module.

10. The method of claim 8, wherein performing the measurement further comprises:
    capturing a plurality of images of a cabin area of the vehicle using a camera of the sensor module; and
    capturing an audio recording of the cabin area of the vehicle using a microphone of the sensor module.

11. The method of claim 8, further comprising:
    receiving a vehicle state dataset using the antenna module of the sensing device;
    saving the vehicle state dataset in a non-transitory memory of a sensing device controller of the sensing device; and
    transmitting the vehicle state dataset using the antenna module of the sensing device in response to receiving the excitation signal.

12. The method of claim 11, wherein receiving the vehicle state dataset further comprises:

receiving the vehicle state dataset using the antenna module of the sensing device, wherein the vehicle state dataset includes at least one of: a current vehicle speed, a current vehicle fuel level, a current vehicle battery state of charge, and a number, identity, and location of occupants in the vehicle.

13. The method of claim 12, further comprising:

receiving a plurality of measurements and a plurality of vehicle state datasets from one or more sensing devices using an external transceiving device;

stitching the plurality of measurements and the plurality of vehicle state datasets from one or more sensing devices using a transceiving device controller of the external transceiving device to generate a processed vehicle state dataset; and displaying the processed vehicle state dataset using a display of the external transceiving device.

14. A system for providing information about a vehicle involved in a collision, the system comprising:

an external transceiving device, wherein the external transceiving device includes a transceiving device display, a transceiving device communication system, and a transceiving device controller in electrical communication with the transceiving device display and the transceiving device communication system, wherein the transceiving device controller is programmed to:

transmit an excitation signal using the transceiving device communication system;

receive one or more response messages using the transceiving device communication system;

stitch the one or more response messages to form a processed response message, wherein to stitch the one or more response messages, the transceiving device controller is programmed to temporally align frames or sections of two or more response messages to form the processed response message; and display the processed response message using the transceiving device display; and a sensing device affixed to the vehicle, wherein the sensing device includes a sensor module configured to perform measurements of one or more conditions of the vehicle, an antenna module configured to transmit and receive radio-frequency (RF) signals, a power module configured to provide power to the sensing device, and a sensing device controller in electrical communication with the sensor module, the antenna module, and the power module, and wherein the sensing device controller is programmed to:

receive the excitation signal from the external transceiving device;

perform a measurement using the sensor module in response to receiving the excitation signal; and transmit the measurement to the external transceiving device using the antenna module; and a vehicle communication system in electrical communication with a vehicle controller, wherein the vehicle controller is programmed to:

wirelessly transmit a vehicle state dataset to the sensing device using the vehicle communication system, wherein the vehicle state dataset includes one or more status metrics of various vehicle systems.

15. The system of claim 14, wherein the sensing device controller is further programmed to:

receive the vehicle state dataset from the vehicle communication system; and transmit the vehicle state dataset to the external transceiving device using the antenna module in response to receiving the excitation signal.

16. The system of claim 15, wherein the vehicle state dataset includes at least two of: a current vehicle speed, a current vehicle fuel level, a current vehicle battery state of charge, and a number, identity, and location of occupants in the vehicle.

* * * * *